Oct. 7, 1924.
O. RIBARSCH
VEHICLE TIRE
Filed Feb. 8, 1924
1,511,175
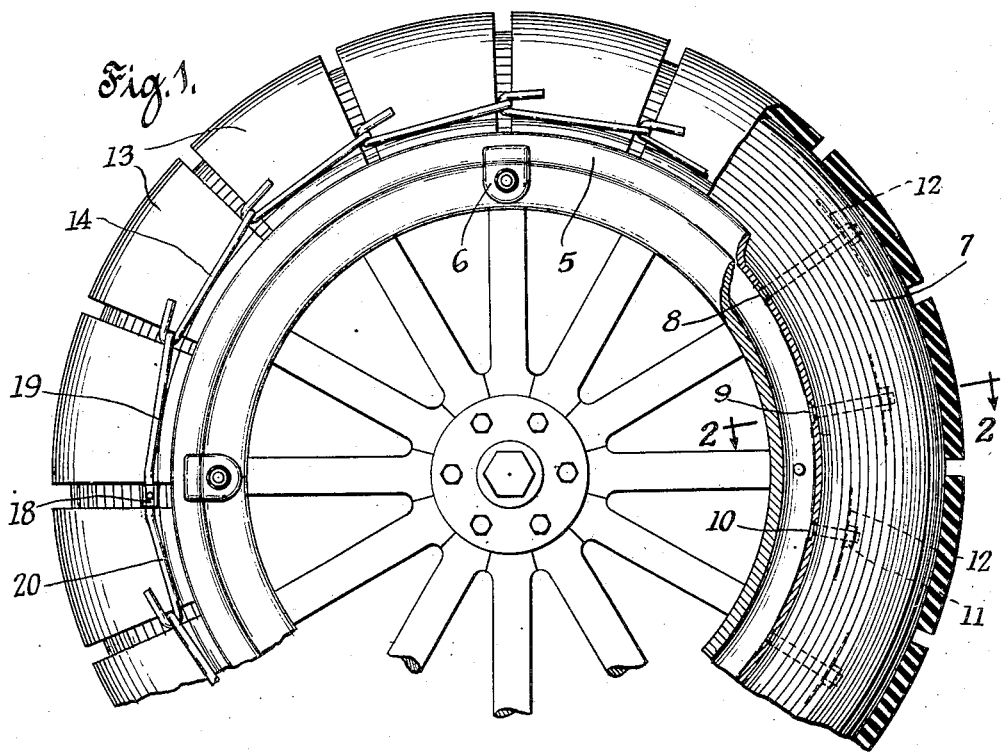
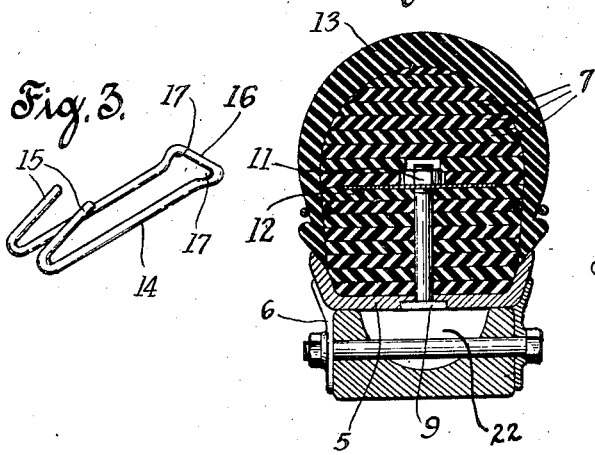
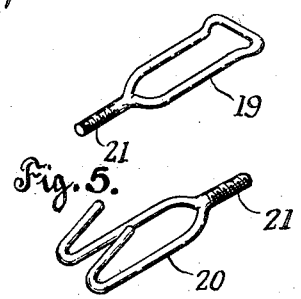
INVENTOR
Otto Ribarsch
BY
Philip S. McKean ATTORNEY Patented Oct. 7, 1924.

1,511,175

UNITED STATES PATENT OFFICE.

OTTO RIBARSCH, OF NEW YORK, N. Y.

VEHICLE TIRE.

Application filed February 8, 1924. Serial No. 691,355.

*To all whom it may concern:*

Be it known that I, OTTO RIBARSCH, a citizen of the United States, and a resident of the city, county, and State of New York, have invented certain new and useful Improvements in Vehicle Tires, of which the following is a specification.

The objects of the present invention are to provide a cushion tire for motor vehicles of a non-skid character which will be sufficiently resilient to provide the desired riding qualities, of a permanent lasting construction, relatively inexpensive and capable of being made up in part, at least, of materials ordinarily considered as a waste product.

These desired results are attained through certain novel features of construction, combination and relations of parts, as will be clear from the following specification.

In the drawing accompanying and forming part of this specification, a practical embodiment of the invention is illustrated, wherein Figure 1 is a broken and part sectional view showing the tire mounted as in actual use.

Figure 2 is an enlarged cross sectional view on substantially the plane of line 2—2 of Figure 1.

Figures 3 and 4 are detached detail views of two of the links for securing the casing sections.

Figure 5 is a detailed view of the companion turn-buckle link to that shown in Figure 4.

The rim 5 may be of any usual or special form and is shown of ordinary open trough construction secured in place on the felly of a wheel by lugs and rim bolts at 6.

The body of the tire consists of a series of layers or laminations 7 of soft resilient live rubber laid up about the rim and secured in a manner to prevent any "creeping" tendencies. These layers are preferably secured together by an elastic cement and may be built up from a continuous strip superposed in successive layers over the rim or by individually separate layers, the first seated in the bottom of the rim with the successive layers applied one over the other.

This highly resilient tire body is anchored to the rim in the illustration by a succession of bolts 8, 9, 10 of different lengths extending from the under side of the removable rim different distances up into the body of the tire and there provided with heads or nuts 11 bearing on washers or wear plates 12. These bolts usually are arranged as indicated in Figure 1 with the successively shorter ones in succeeding relation followed by a series of successively longer bolts, about the circumference of the wheel, this giving all the desired resiliency and preventing the tire body from creeping or working loose.

To protect the resilient body from wear and preserve its cushioning qualities, the same is covered by a casing made up of enclosing sections 13 shown secured together by a series of jointed links 14.

The structure of these links may vary but they are shown herein as made up for the most part in the U-shaped form illustrated in Figure 3 with the upturned ends 15, and with the parallel side portions connected at the rear with straight bars 16, the sides being widened out somewhat at the ends of these bores to provide recesses 17 to receive the upturned ends or hooks of adjoining links.

As shown in Figure 1 these links are slipped over the sides of the casing sections with the hooks of one link engaged in the loop of the preceding link, the hooks snapping into the recesses 17 to hold them more securely in this relation. The ends of the chain thus produced may be connected by turn buckle nuts such as indicated at 18, these nuts engaged with special end links 19, 20, having threaded terminals 21 to take such nuts. This construction makes it possible to take up any slack in the chain of links at any time in the course of use of the tire.

Also it is possible with this construction to quickly uncouple the chains, which will lie at opposite sides of the tire, and remove any worn sections, or inspect or repair any other parts of the tire.

The body of the tire is readily constructed by unskilled labor of ordinary live strip rubber, which forms when assembled as disclosed, a resilient cushion capable of carrying all the loads and strains of the tire and protected from abrasion by the sectional casing. The sectional casing may be made up of ordinary tire casings which are defective because of some inherent fault and are usually "junked" by the tire manufacturer. These sections provide, in this construction, the full wearing qualities and serve just as well as a perfect tire casing.

In addition to providing all the necessary cushioning qualities, the tire is, of course, puncture-proof and the sectional construction of the casing increases the traction and prevents slippage and skidding.

The fastening bolts preferably have a free sliding fit in the rim and the felly has a cavity or channel 22 so that under impact these bolts may slide in through the rim and thus not interfere in any way with the uniform resiliency of the tire.

What I claim is:

1. In combination with a felly having a groove, a rim seated over said felly, a resilient tire body on said rim and securing bolts for said tire body slidably engaged with the rim and having head portions at the inner side of the rim shiftable in the movements of the bolts into the groove in the felly.

2. In combination with a felly having a groove, a rim seated over said felly, a resilient tire body on said rim and securing bolts for said tire body slidably engaged with the rim having head portions at the inner side of the rim shiftable in the movements of the bolts into the groove in the felly, said bolts at different portions of the rim extending out to different distances in the resilient tire body.

3. A cushion tire comprising superposed thin layers of highly elastic, soft live rubber forming a highly resilient tire body but incapable of standing road wear or retaining definite shape and a less elastic wear-resisting outer casing secured over said highly resilient tire body and covering the edges of the thin live rubber layers to confine same to definite form and to equalize the stretching efforts of the various individual layers.

4. A cushion tire comprising superposed thin layers of highly elastic, soft live rubber forming a highly resilient tire body but incapable of standing road wear or sustaining definite shape and a less elastic wear-resisting outer casing secured over said highly resilient tire body and covering the edges of the thin live rubber layers to confine same to definite form and to equalize the stretching efforts of the various individual layers, a rim on which the tire body and casing are mounted and means for securing said resilient tire body upon said rim.

In witness whereof, I have hereunto set my hand this 31st day of January, 1924.

OTTO RIBARSCH.